Oct. 2, 1962
E. E. HART
3,056,325
CUTTING APPARATUS HAVING A RECIPROCATING
TOOL CARRIAGE AND STOPPING MEANS
Filed May 26, 1958
3 Sheets-Sheet 1
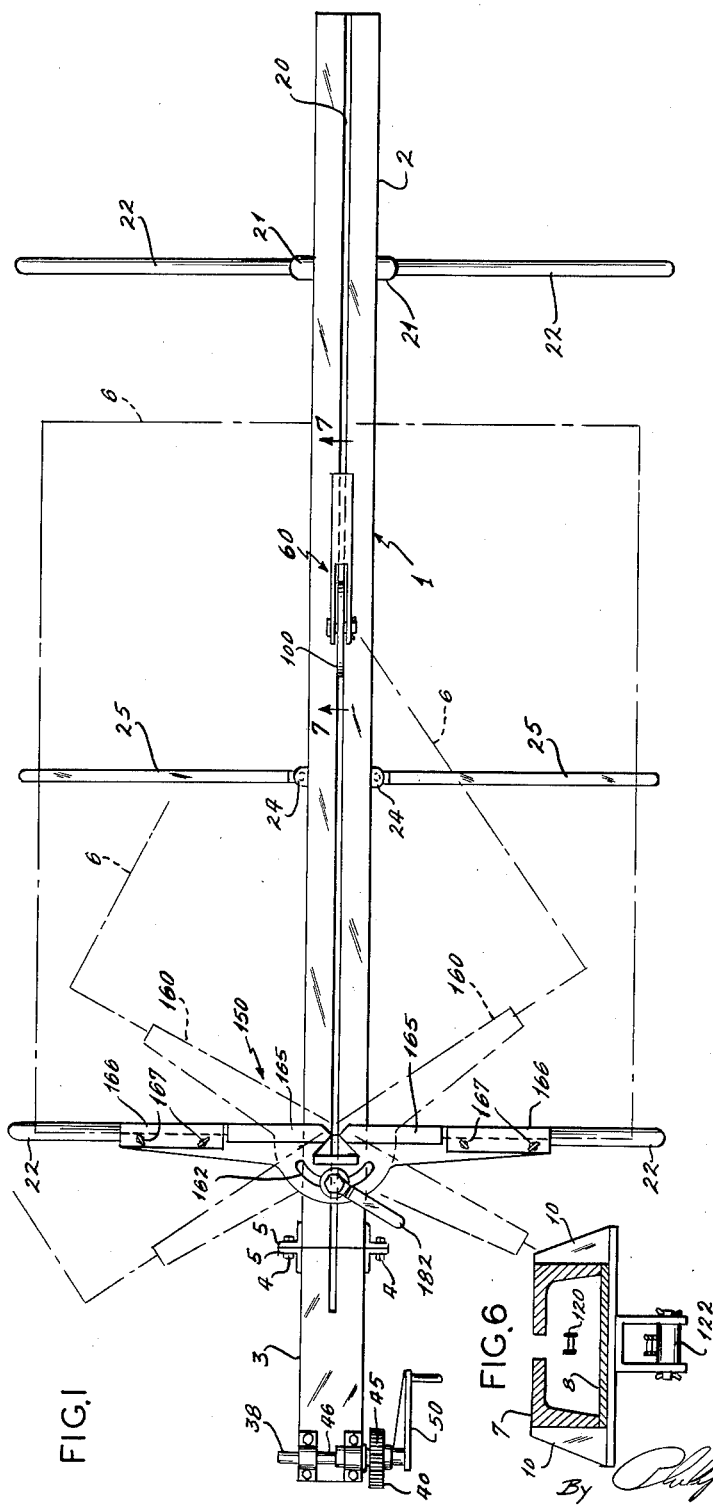
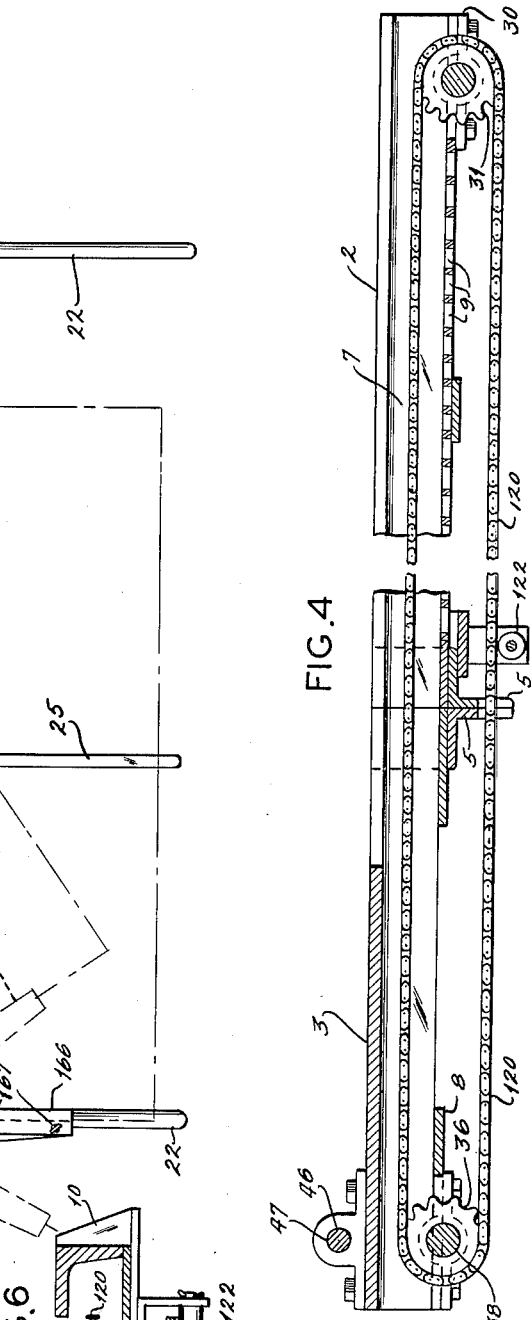
INVENTOR:
EVERETT E. HART
By
ATTORNEY.

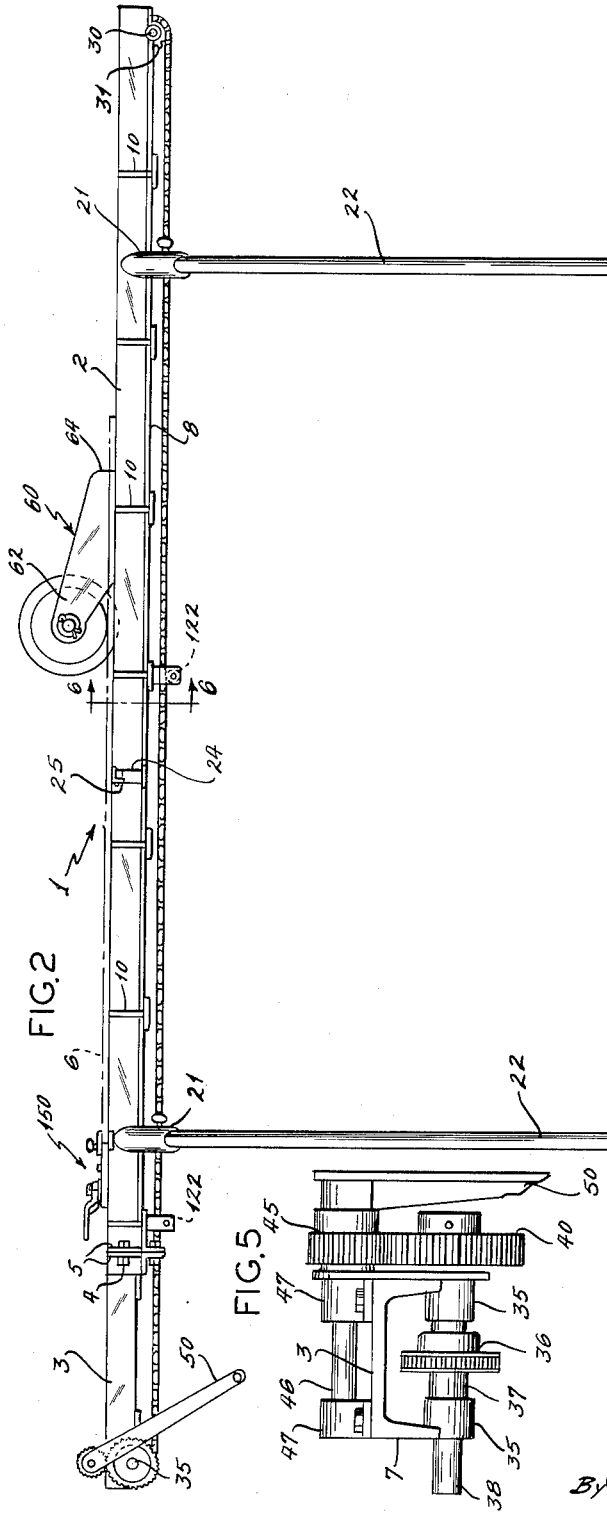

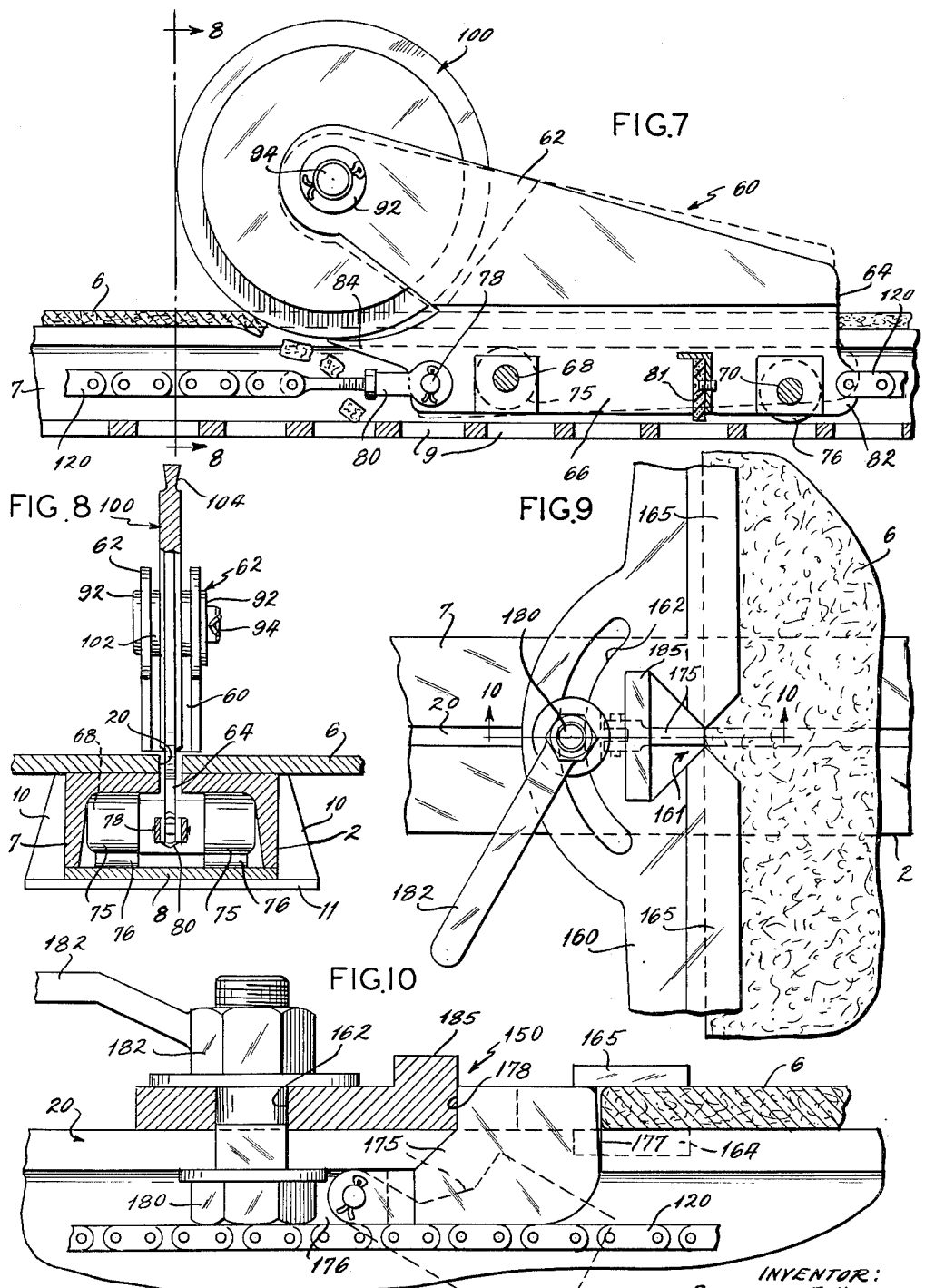

United States Patent Office 3,056,325
Patented Oct. 2, 1962

3,056,325
CUTTING APPARATUS HAVING A RECIPROCATING TOOL CARRIAGE AND STOPPING MEANS
Everett E. Hart, 906 Carlyle Ave., Belleville, Ill.
Filed May 26, 1958, Ser. No. 737,886
1 Claim. (Cl. 83—487)

This invention relates to apparatus for cutting rigid sheet material.

Rigid sheet material, such as asbestos-cement sheets, have been notoriously difficult to cut. One of the virtues of such sheets has been the fact that they can be made in large sizes, but the provision of large sheets has only aggravated the problems of cutting them. The materials of which the sheets are made, are destructive of saw blades. In using the so-called "score and snap" method, which is difficult at best even with relatively small pieces, the edges are rough. By any of the means known heretofore, corners of the material being cut are broken off frequently. The presently used methods of cutting such material are illustrated in a "Manual of Application Methods for Flat Asbestos-Cement Sheet" of the Asbestos-Cement Products Association and a "Standard Asbestos Flexboard Manual" published by Johns-Manville.

One of the objects of this invention is to provide apparatus for cutting rigid sheet material, which is capable of making a smooth, straight cut quickly and easily.

Another object is to provide such apparatus which is simple to manufacture and use, rugged, and uniformly effective.

Still another object of this invention is to provide such apparatus which can be adapted to the use of various sized sheets, and which can be used to cut sheets of any size transversely, longitudinally, or at any angle in between.

Other objects will become apparent to those skilled in the art in the light of the following description and accompanying drawing.

In accordance with this invention, generally stated, apparatus for cutting rigid sheet material is provided, which includes a bed having a slot in it; a disk, a segment of which extends within the slot; a carriage upon which the disk is mounted for rotation; means for restraining movement of the carriage in a direction away from the slot, and means for moving the carriage, hence, the disk, along the length of the slot. The sheet material is positioned along the slot, and means are provided for restraining movement of the sheet material during the cutting process. Means are also provided for preventing the breaking out of the free corners of the material when it is cut.

The bed is preferably so constructed that it can easily be lengthened or shortened, in the first instance, to accommodate longer sheets, and in the second instance, to conserve space. The term "bed" is used herein to describe a rigid, slot-defining element, which is not necessarily flat or wide enough to give substantial support to the sheet being cut, although the bed of the preferred embodiment described is both.

In the drawing, FIGURE 1 is a top plan view of one illustrative embodiment of apparatus of this invention;

FIGURE 2 is a view in side elevation of the apparatus of FIGURE 1;

FIGURE 3 is a fragmentary enlarged detail top plan view of the apparatus of FIGURE 1;

FIGURE 4 is a sectional view taken along the line 4—4 of FIGURE 3;

FIGURE 5 is a fragmentary view in rear elevation of the device of FIGURE 1;

FIGURE 6 is a sectional view taken along the line 6—6 of FIGURE 2;

FIGURE 7 is a sectional view taken along the line 7—7 of FIGURE 1;

FIGURE 8 is a sectional view taken along the line 8—8 of FIGURE 7;

FIGURE 9 is a fragmentary enlarged detail top plan view of a part of the adjustable stop mechanism; and FIGURE 10 is a sectional view taken along the line 10—10 of FIGURE 9.

Referring now to the drawing for one illustrative embodiment of this invention, reference numeral 1 indicates a bed, which, in the embodiment shown, is made up of an idler sprocket section 2 and a drive sprocket section 3. The sections 2 and 3 are held rigidly together by means of bolts 4, extending through flanges 5 welded to the respective sections.

The bed 1 of this embodiment is a rigid, box type shape, which is preferably formed of steel or cast iron. Each section can be an integral unit, or, as indicated in FIGURE 8, may be made up of a heavy channel 7 and a bottom plate 8 welded together. The bottom plate 8, or the bottom wall of an integral shape, is provided with spaced openings 9. As shown particularly in FIGURES 2 and 8, the section 2 has a series of buttresses 10, welded to an underlying plate 11 and to the side walls of the section 2, to give added strength and rigidity to the section. In the case of a cast integral shape, the buttresses 10 may be cast integrally with the shape. The buttresses 10 and plate 11 may also be cast in one piece, and the channel members of the cutting bed and bottom plate may be bolted or otherwise fastened to them. A slot 20 extends entirely through the top wall of the bed 1. The slot 20, in the embodiment shown, extends the full length of the section 2, but stops short of the free end of the section 3. Sockets 21 are welded to the section 2, to receive legs 22, which may be lengths of pipe. Knuckles 24 are welded to the sides of the section 2, to pivotally support sheet supporting arms 25. For very long sheets, auxiliary trestles may be used for support, or additional knuckles and arms may be provided.

As shown particularly in FIGURES 2, 3 and 4, at the free end of the section 2, parts of the bottom and side walls of the section 2 are cut away to accommodate idler sprocket bearings 30, and an idler sprocket 31. The idler sprocket bearings 30 are bolted to the bottom of the section 2. At the free end of the section 3, the side walls and bottom are partly cut away to accommodate drive sprocket bearings 35 and a drive sprocket 36. The drive sprocket 36 is mounted on a shaft 37, both ends of which extend beyond the bearings 35. One end, 38, of the shaft 37 is squared or otherwise adapted to receive a crank. The other end of the shaft 37 carries a large gear 40. A pinion 45, engaging the gear 40, is carried by a shaft 46 journaled in pillow blocks 47 bolted to the top of the section 3. The shaft 46 extends beyond the pinion 45, and is squared or otherwise adapted to receive a crank 50.

Mounted within and projecting above the bed 1 is a carriage 60. In this embodiment, the carriage 60 consists of an upper, yoke section 62, an intermediate, neck section 64, and a lower roller carrying section 66. The lower section 66 is relatively wide, as indicated in FIGURE 8, and carries an upper front axle 68 and a lower rear axle 70. The front axle 68 carries a pair of rollers 75, the outer edges of which are curved to fit the curve between the top and the side walls inside the bed 1, as shown in FIGURE 8. The rear axle 70 carries a pair of rollers 76. Forward of the front axle 68, the section 66 carries a demountable clevis pin 78, which carries a clevis 80. A flexible, chip-sweeping plow 81 may also be carried intermediate the rollers 75 and 76, as shown in FIGURE 7. Rearwardly of the rear axle 70, the section 66 has an ear 82 to which a chain can be attached.

The neck section 64 is thin enough to fit loosely both in the slot 20 and in a kerf in sheet material 6 being cut, and wide (vertically) enough to accommodate the thickness of the material 6. The neck section 64 connects the roller carrying section 66 with the yoke section 62. The neck section carries a chip clearing prong 84, which in the embodiment shown, is integral with the neck section.

The yoke section 62 has a pair of bearing plates 92 extending forwardly of the carriage. The plates 92 carry a hardened axle pin 94, upon which is mounted, for free rotation, a disk 100.

In the embodiment shown, the disk 100 has a heavy hub 102. At its perimeter, the disk is relieved to define a rim section 104, which flares outwardly radially, so that the rim section 104 is trapezoidal in cross-section with the base of the trapezoid at the outermost edge of the disk. The rim section 104 of the disk is treated to make it extremely hard. As is shown in FIGURE 7, the prong 84 lies close to the perimeter of the disk 100. It is as thick as the curved face of the disk, and serves to dislodge material which may tend to adhere to the face of the disk. As is indicated in FIGURE 7, the upper surface of the prong flares away, radially from the disk, so that material which passes the front edge of the prong 84 cannot wedge between the disk face and the upper surface of the prong 84.

A roller chain 120 is attached to the clevis 80 at one end, travels around the drive sprocket 36, extends, with its lower reach, beneath the bed 1, over a supporting roller 122 carried by the bed, extends around the idler sprocket 31, and is connected at its other end to the ear 82 on the carriage 60. The travel of the chain 120 is shown particularly in FIGURE 4.

Mounted on the section 2 of the bed 1, near the end at which it is joined to section 3, is a stop assembly 150. In the embodiment shown, stop assembly 150 includes an angularly adjustable fence 160, and a dropping, kerf spanning stop member 175.

The fence 160 consists essentially of an elongated plate which presents a flat, vertically extending face to meet the straight edge of a sheet supported on the bed 1, with a central throat 161, aligned with the slot 20, and an arcuate slot 162, with its radius substantially centered in the constricted middle of the throat 161. The fence 160 rests on the upper surface of the bed 1, and is held in position by a bolt 180, the head of which is welded to the underside of the top wall of the bed and the shank of which extends upwardly through the slot 162, and a lug nut 182.

The fence 160, in the embodiment shown, has a supporting plate 164 projecting from its underside at either end, positioned sufficiently far outboard of the bed so as not to interfere with the angular movement of the fence 160. The fence 160 also has an overlying hold-down plate 165 extending from the throat to a point near the supporting plate 164. Above the supporting plate 164, on both arms of the fence, are clamping plates 166, with thumb screws 167, by which the sheet material can be held to prevent skewing of the sheet.

The throat 161 is hourglass shaped. A disk stop 185, preferably made of brass or some similar material which is not likely to chip or damage the disk, extends along the base of the hourglass-shaped throat. The most restricted part of the throat 161 is somewhat wider than the slot 20, to accommodate the slot 20 in any position of the fence 160 permitted by the arcuate slot 162, with the slot 20 centered in the throat 161.

The kerf-spanning stop 175 is provided to give support to the edges of the sheet on either side of the kerf produced by the disk 100. It is thick enough to fill the slot 20, but to fit loosely therein. It is hinged at one end to a lug 176, welded to the head of the bolt 180. The (vertical) width of the stop 175 is such as to permit its upper part to project through the slot 20 sufficiently far to permit its front face 177 to engage the edge of the sheet to be cut, and its lower surface to rest upon the chain 120 when that chain is taut. The front face 177 is given a small amount of draft, to give it a wedging action against the edge of a sheet as it rises, and to free it readily when it is depressed. A rear face 178 of the stop 175 abuts the disk stop 185 in the upper position of the stop 175.

The assembly of the machine is self-evident. In the operation of the machine, the crank 50 is turned so as to pull the carriage 60 away from the fence 160 far enough to permit the placing of a sheet of material 6 between them. The arms 25 are swung out to the position shown in FIGURE 1. The lug nut 182 is tightened to maintain the fence 160 in the desired position. The sheet of material 6 is laid on the bed 1 and arms 25, slid against the length of the face of the fence 160 and clamped tight with the clamping plates 166, by turning down the thumb screws 167.

The handle 50 is now turned to move the drive sprocket 36 in a counterclockwise direction, as viewed in FIGURE 4, to pull the carriage 60, with the disk 100, toward the material 6. As the disk meets the edge of the material, it tends to ride up, bringing the front rollers 75 into firm engagement with the upper inside wall of the bed 1, as shown in FIGURES 7 and 8, and the rear roller 76 into engagement with the bottom wall. The upper reach of the chain 120, between the carriage 60 and the drive sprocket 36, is put under tension, raising the stop 175 into position and maintaining it there, as indicated in FIGURE 10.

The translation of the carriage and the engagement of the disk rim with the material, cause the disk to rotate as the carriage moves along. While the action of the disk is not well understood, it produces a clean, sharp, straight cut, the full width of the outer edge of the rim 104, with little or no lateral load on the slot walls. The neck portion 64 of the carriage, of slightly less thickness than the outer rim portion of the disk, rides in the kerf behind the disk.

When the disk reaches the throat 161 of the fence 160, it engages the stop 175, and starts to push that member down, against the bias of the chain 120, until, when the disk has cut through the outer edge of the sheet of material, the stop 175 is completely out of the way. In the meanwhile, however, the stop 175 has supported the free edges of the sheet sufficiently to prevent breaking out of the edges.

Simply by way of example and not by way of limitation, the disk 100 may be made 6 inches in diameter, with the rim 104 ½ inch wide (radially), ¼ inch thick at its outside edge, and ³⁄₁₆ inch thick at its root. That is to say, the rim is relieved ¹⁄₃₂ of an inch on each side. The disk extends, when in operation, ⅛ inch into the slot 20, which is ⁵⁄₁₆ of an inch wide. A number 40 chain, with standard sprockets may be used. With this arrangement, asbestos-cement boards ranging in thickness from ⅛ to ¼ inch can be cut with ease.

When the board to be cut is thin, for example, ⅛ inch, the crank 50 may be put on the shaft 38, and the drive sprocket 36 driven directly, to speed the work. For heavier work, the arrangement described, in which the gear ratio of the pinion 45 to the gear 40 is about 1–2, is satisfactory.

It can be seen that a larger disk may be used, and a greater gear reduction, particularly in the case of larger, thicker stock. Another application in which a larger disk, and a wider rim may be used, is in the cutting of corrugated materials. In such an application, either the top surface of the bed 1 may be corrugated complementarily to the corrugated material, or a suitable fixture may be attached to the top surface of the bed, with a flat, vertical face, forming an extension of the wall defining the slot, on either side of the slot. Such a fixture can be made relatively narrow, transversely of the slot, and the peaks can be made on the same centers as the peaks of the corrugated material, but steeper, so that the corrugated material can be canted with respect to the fixture.

In order to accommodate larger sheets, the machine can be lengthened by merely inserting, between bed sections 2 and 3, one or more intermediate sections, flanged on both ends and slotted throughout the length of the top wall, and inserting an additional length of chain.

Other drive means, such as a rack and pinion or jackscrew can be used instead of the chain, but the chain offers many advantages.

Numerous variations in the construction of the machine, within the scope of the claim will become apparent to those skilled in the art in the light of the foregoing disclosure.

Having thus described the invention, what is claimed and desired to be secured by Letters Patent is:

Apparatus for cutting rigid frangible sheet material comprising a bed having an elongated slot therein; a disk, a segment of which extends within said slot; a carriage having a part extending upwardly through the said slot, of a thickness no greater than the thickness of the peripheral face of the disk, said disk being mounted for free rotation on said carriage on an axle above said slot and offset forwardly longitudinally of the slot from said carriage part; means on said carriage for restraining upward movement thereof; a drive sprocket mounted below and at one end of said slot and an idler mounted below and at the other end of said slot, a roller chain extending around said drive sprocket and idler and connected to the said carriage beneath said slot; and a stop at one end of said slot, said stop being pivotally mounted beneath the slot and above said chain, having a part extending through the slot and a part bearing upon the upper reach of said chain, said upper reach of said chain being tensioned while moving, to elevate the stop to raised, workpiece engaging position whereat the top of the stop is substantially coincident with the top of the workpiece, whereby the disk, engaging the top of the stop at the end of the slot, forces the stop downwardly against the bias of the chain.

References Cited in the file of this patent
UNITED STATES PATENTS

| | | |
|---|---|---|
| 371,961 | Mason | Oct. 25, 1887 |
| 414,453 | Simmons | Nov. 5, 1889 |
| 1,039,738 | Heynau | Oct. 1, 1912 |
| 1,279,880 | Krafft | Sept. 24, 1918 |
| 2,088,202 | Gray | July 27, 1937 |
| 2,187,134 | McCarthy | Jan. 16, 1940 |
| 2,599,601 | Axworthy | June 10, 1952 |

FOREIGN PATENTS

| | | |
|---|---|---|
| 584,058 | Germany | Sept. 14, 1933 |
| 969,519 | France | May 24, 1950 |
| 707,428 | Great Britain | Apr. 14, 1954 |